United States Patent [19]
Adler et al.

[11] Patent Number: 5,184,069
[45] Date of Patent: Feb. 2, 1993

[54] ROTATIONAL SPEED SENSOR UTILIZING MAGNETIC INK TONE RING

[75] Inventors: Jonathan M. Adler, Ypsilanti; Russell E. Monahan, Ann Arbor; Robert W. Frayer, Jr., Gregory, all of Mich.

[73] Assignee: NTN Technical Center, (U.S.A.) Inc., Ann Arbor, Mich.

[21] Appl. No.: 802,125

[22] Filed: Dec. 3, 1991

[51] Int. Cl.$^5$ .......................... G01B 7/14; G01P 3/48
[52] U.S. Cl. .................. 324/207.22; 324/207.25; 324/174
[58] Field of Search ............... 324/160, 166, 172, 174, 324/207.22, 207.25

[56] References Cited

U.S. PATENT DOCUMENTS

| | | | |
|---|---|---|---|
| 2,602,837 | 7/1952 | Forster et al. | 324/172 |
| 4,288,746 | 9/1981 | Singbartl . | |
| 4,319,188 | 3/1982 | Ito et al. . | |
| 4,667,156 | 5/1987 | Machino et al. . | |
| 4,688,951 | 8/1987 | Guers . | |
| 4,783,180 | 11/1988 | Hayashi . | |
| 4,864,231 | 9/1989 | Okumura et al. . | |
| 4,865,468 | 9/1989 | Kato et al. . | |
| 4,866,269 | 9/1989 | Wlodarczyk et al. . | |
| 4,960,333 | 10/1990 | Faye et al. . | |
| 4,965,517 | 10/1990 | Shelton et al. . | |
| 5,002,404 | 3/1991 | Zernickel et al. . | |

*Primary Examiner*—Walter E. Snow
*Attorney, Agent, or Firm*—Harness, Dickey & Pierce

[57] ABSTRACT

A hub and bearing assembly particularly adapted for motor vehicle application having anti-lock braking system (ABS). Wheel speed sensors are provided in accordance with this invention having a tone wheel configured from a support substrate having a layer of magnetic ink coated thereon. The magnetic ink is magnetized after coating and can be used in conjunction with passive sensors such as variable reluctance types, or active sensors including semi-conductor Hall effect types. The wheel speed sensors of this invention can be adapted for driven or non-driven wheel applications and are sufficiently compact to enable the device to be integrated into the bearing structure and protected from environmental exposure.

14 Claims, 4 Drawing Sheets

ROTATIONAL SPEED SENSOR UTILIZING MAGNETIC INK TONE RING

BACKGROUND AND SUMMARY OF THE INVENTION

This invention relates to a rotational speed sensor and particularly to one incorporated within a rolling element bearing.

Anti-lock braking systems (ABS) are increasingly popular on present day motor vehicles. Such systems are provided to automatically prevent wheel lock-up during hard braking maneuvers by relieving braking pressure in such conditions so that vehicle stability and directional control can be maintained. A critical feature of an ABS is a wheel speed sensor which provides an output to an ABS controller related to wheel rotation. Many passenger cars have such a sensor for each of their four wheels. Through such inputs, the braking system controller can determine if a wheel lock-up condition has occurred or is being approached and thus control the braking system. Wheel speed sensors are also used to provide inputs for traction control systems which reduce shippage during acceleration.

Numerous designs of ABS wheel speed sensors are presently known. Such sensors generally consist of a rotating part in close proximity to a stationary part. The rotating part, or "tone ring" has features which can be sensed as they pass the stationary part. Such features are typically ferromagnetic teeth, as on a gear, or magnetic poles which have been applied to the part. The stationary part includes a transducer which can detect the passing of the features as the tone ring rotates. The detection is indicated by an electrical signal which is emitted by the transducer. The transducer may be a variable reluctance device, Hall effect device, magnetorestrictive device, or of some other construction. Generally, the transducer is a device which senses magnetic fields or changing magnetic fields. Variable reluctance transducers are referred to as "passive" sensors in that they generate a voltage without being energized by an external source. Active sensors such as a Hall effect device are energized by an externally applied voltage and provide an output responsive to the magnetic fields passing through them.

Although sensors utilizing the above described technologies have been implemented with success, designers of such systems are constantly striving to increase their reliability, reduce packaging space requirements, facilitate production, assembly and calibration, all the while seeking to reduce their cost. Of principal concern is protecting the sensor elements from contaminants and environmental exposure. Road debris such as dirt, dust and water can interfere with an unprotected sensor. In addition, dust from braking surfaces and significant temperature extremes can be applied to the sensing system unless steps are taken to protect it. A present trend in wheel speed sensor design is to integrate the sensor into a wheel bearing assembly enabling the system to be aligned and tested prior to being shipped to the vehicle manufacturer. Moreover, such an integrated configuration facilitates vehicle assembly on the assembly line.

In accordance with the present invention, an ABS wheel speed sensor system is provided in which a magnetized tone ring is provided which rotates with respect to a stationary transducer. Although these inventors have implemented this system in conjunction with an active sensor, this invention could find equal utility in a passive sensor of the type utilizing a rotating magnetized disk or other systems utilizing a rotating magnetized tone ring. A significant feature of this invention is the formation of the tone ring using a substrate coated with magnetic ink. Magnetic ink can be coated as a thin layer on the substrate and is thereafter magnetized to produce alternating magnetic poles. Preferably, the tone ring and associated transducer are within the rolling element cavity of the bearing and protected from environmental factors by the bearing seals. The ability of the sensor according to this invention to be made in a compact form enhances its ability to be sealed within the bearing cavity. It is further believed that fabrication of the tone ring which can be printed with magnetic ink instead of machined, casted or molded provides cost and design flexibility advantages. In fact, this invention would enable existing surfaces within a bearing or hub to be directly coated with magnetic ink, thereby eliminating a discrete tone ring element entirely.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE INVENTION

Figure 1:
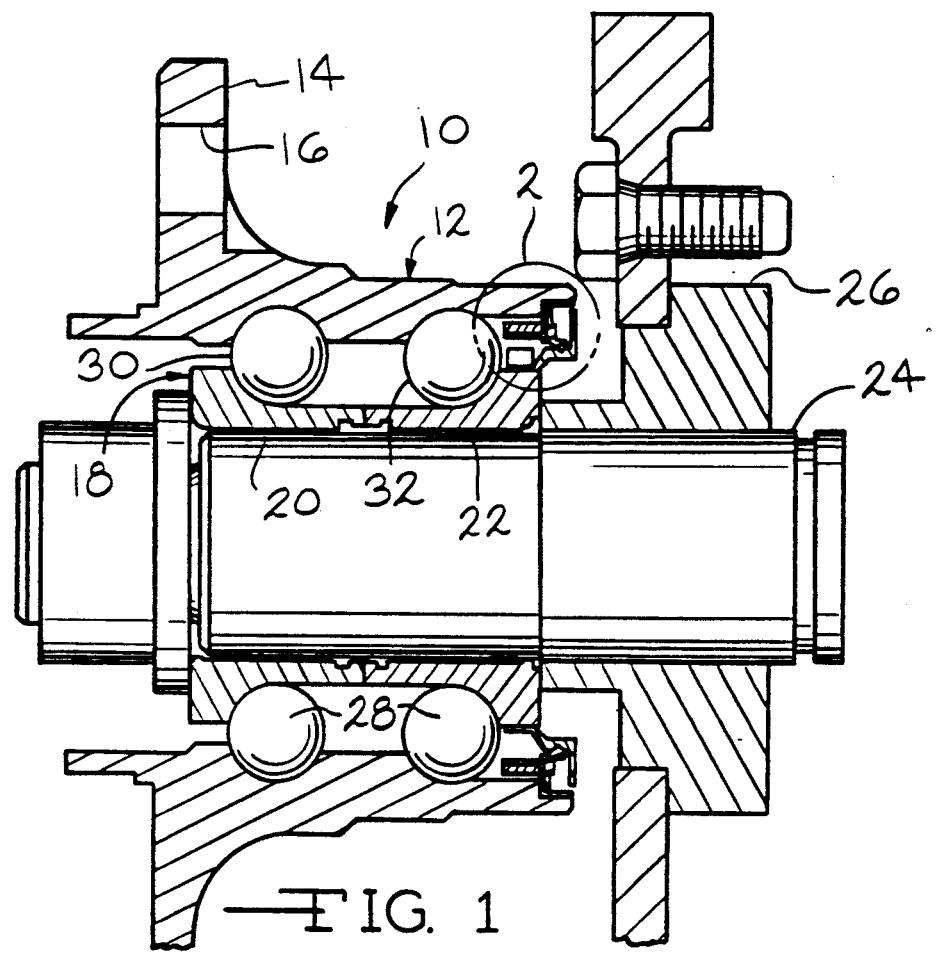
FIG. 1 is a cross-sectional view of a hub and bearing assembly for a motor vehicle incorporating the rotational speed sensor of this invention for application with a non-driven axle.

A wheel bearing and hub assembly incorporating the features of the present invention is shown in FIG. 1 and is generally designated there by reference number 10. Assembly 10 fully integrates the hub and bearing elements, as opposed to more conventional constructions having a separately installed bearing unit. Bearing and hub assembly 10 shown in FIG. 1 is adapted for use with a non-driven axle. As shown, bearing outer race 12 defines a wheel mounting flange 14 having a number of wheel mounting stud bores 16. Bearing inner race 18 is comprised of a pair of assembled race cones 20 and 22. Inner race 18 is fit onto a non-rotating wheel spindle 24. Spindle 24 is mounted to the vehicle through mounting flange 26. Rolling elements, in this case ball elements 28, are provided to define outboard race 30 and inboard race 32. The region of assembly 10 in which ball elements 28 are housed is sealed from the environment by a pair of seals. The inboard seal assembly will be described below. The outboard seal assembly is not shown in FIG. 1 but would be of conventional construction and pressed into engagement with outer race 12 and would include a lip sealing element contacting either inner race 18, or spindle 24. Spindle 24 defines features for clamping inner race 18 to retain bearing and hub assembly 10 from being pulled off spindle 24 in use.

Figure 2:
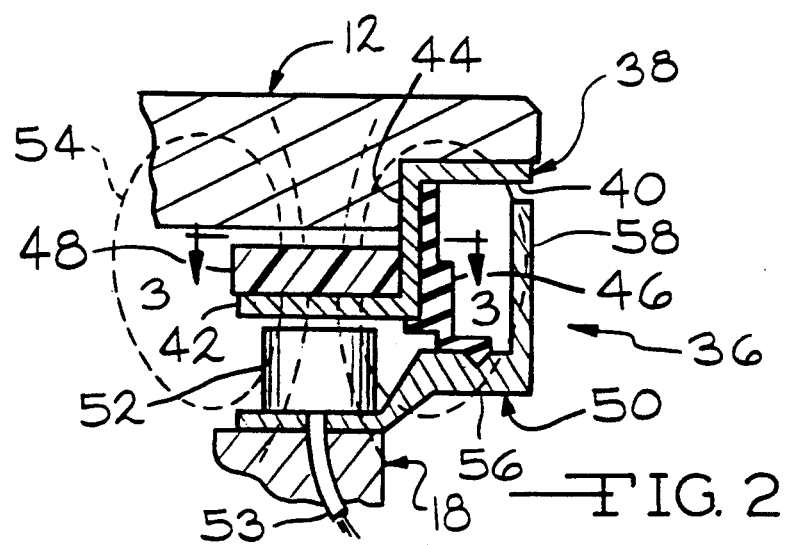
FIG. 2 is an enlarged partial view taken from FIG. 1 particularly showing elements of the rotational speed sensor.

With particular reference to FIG. 2, a first embodiment of wheel speed sensor assembly 36 in accordance with this invention is shown. Tone ring 38 includes an outer flange 40 enabling it to be press-fit into a corresponding counter-bore within outer race 12. Tone ring 38 also includes a second cylindrical surface which defines a tone wheel substrate 42. The radial face portion 44 of the tone ring defines the surface for supporting an elastomeric seal 46.

In accordance with a principal feature of this invention, a layer of magnetic ink 48 is coated onto tone ring 42 and is thereafter magnetized to define an alternating pole configuration as will be described in further detail. The Figures show the thickness of the magnetic ink layers exaggerated or the sake of illustration. Alternatively, the magnetic ink layer can be printed in a pattern which defines areas of strong and weak magnetization. Magnetic ink has many of the physical properties of a standard printing ink. A pigment is held in a fluid suspension. After application to a surface the fluid hardens generally by evaporation of a solvent or through some chemical means. The difference is that the "pigment" of magnetic ink consists of a magnetic material such as ferrite. When exposed to a strong magnetic field, the magnetic particles will hold some residual field. The residual field is the critical feature of magnetic ink, in that it can be sensed by an appropriate transducer.

A transducer mounting ring 50 is press-fit onto inner race 18 and mounts a transducer device such as Hall effect device 52. Electrical cable 53 conducts signals from transducer 52 to an onboard controller. Mounting ring 50 also defines a cylindrical flange 56 which engages seal 46 and a radial flange 58 which provides enhanced protection for the speed sensor by providing a labyrinth type sealing system.

Figure 3:
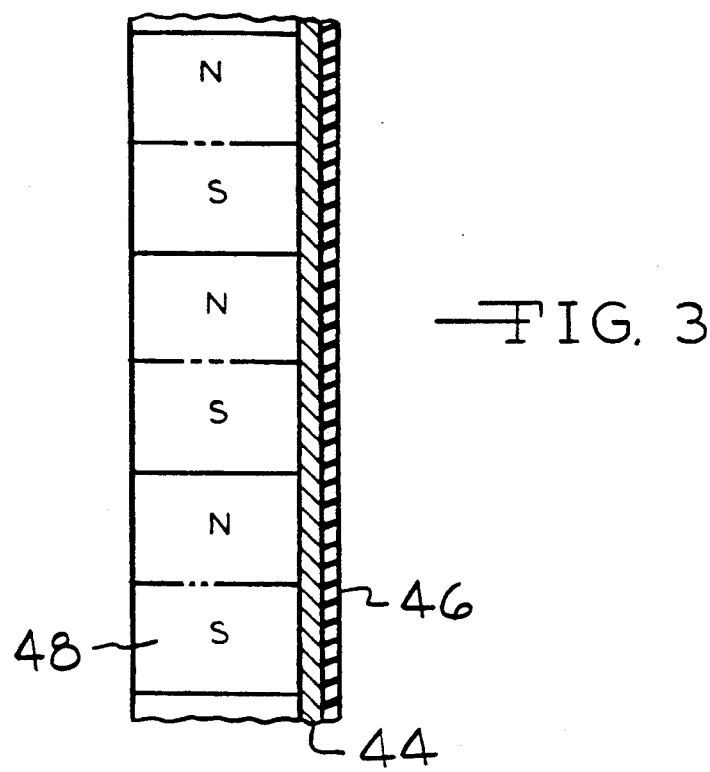
FIG. 3 is a cross-sectional view taken along line 3—3 of FIG. 2 showing one possible magnetization pattern of the tone ring of this invention.

FIG. 3 illustrates that magnetic ink layer 48 is magnetized to define alternating polarity North and South magnetic poles. The dashed lines 54 in FIG. 2 designate the magnetic field flux lines produced by the magnetized regions of magnetic ink layer 48 and are shown cutting through the surface of transducer 52. In operation, as bearing outer race 12 rotates with vehicle motion, magnetic ink layer 48 rotates with respect to the stationary transducer 52. Accordingly, transducer 52 is exposed to magnetic fields having an alternating direction which produces an output which is processed by the ABS controller.

Figure 4:
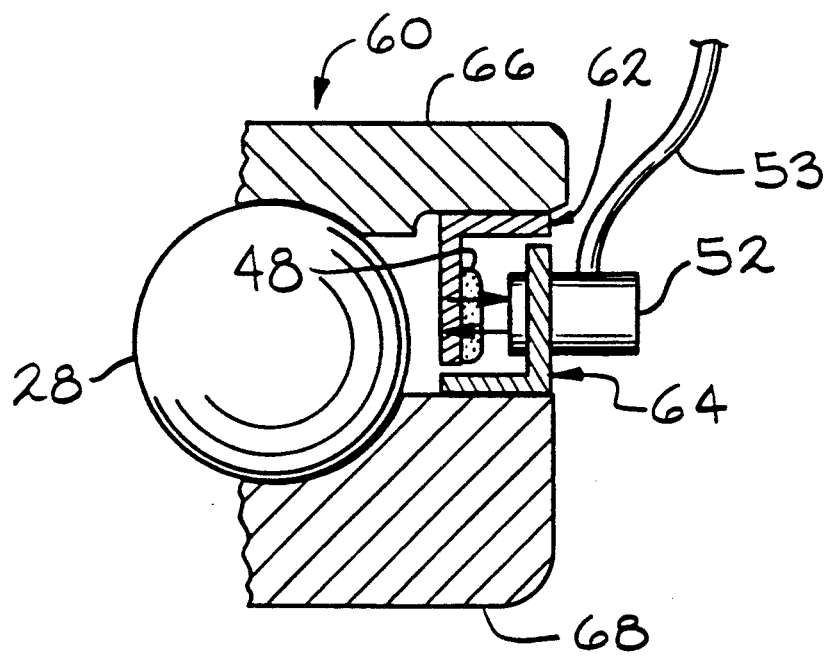
FIG. 4 is a partial cross-sectional view of a bearing assembly in accordance with a second embodiment of this invention for motor vehicle applications in which the associated axle is non-driven as in FIG. 1, but showing the tone ring defining a radial magnetized surface.

Now with reference to FIG. 4, an alternate embodiment of a wheel speed sensor 60 is shown. Since many of the elements of this embodiment and those which will be described hereafter have features common to that of hub and bearing assembly 10 previously described, they will be identified to like reference numbers. Unlike the first embodiment, sensor 60 is installed within a bearing unit which is separately installed within a bore in a hub shell, and includes outer race 66 and inner race 68. In the embodiment of FIG. 4, a modified tone ring 62 and transducer mounting ring 64 are provided. For this embodiment, tone ring 62 has a "L" shaped cross-sectional configuration in which magnetic ink layer 48 is formed along a radial surface as opposed to a cylindrical surface as shown in FIG. 2. For this application, transducer mounting ring 64, also having an "L" shaped section, mounts transducer 52 to confront the radial surface. Although not shown in FIG. 4, a seal of generally conventional configuration would extend between outer race 66 and inner race 68. As is the case with the embodiment shown in FIGS. 1 and 2, wheel speed sensor 60 is also intended for application with a non-driven axle in which case the inner race 68 remains stationary while outer race 66 rotates with the vehicle wheel.

Figure 5:
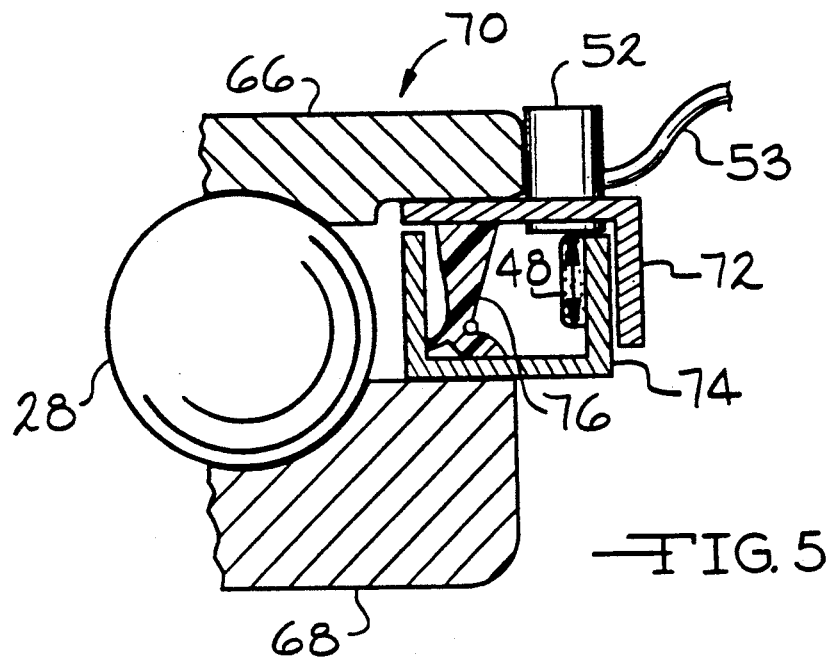
FIG. 5 is a partial cross-sectional view of a bearing assembly in accordance with a third embodiment of this invention for a driven wheel application using a larger sensor.

The embodiment of FIG. 5 of a wheel speed sensor 70 is intended for application for driven axles in which outer race 66 is held stationary while inner race 68 rotates with the wheel. As is shown in FIG. 5, transducer mounting ring 72 is pressed into a bore of outer race 66. Tone ring 74 defines a "U" shaped sectional configuration having a radial surface with magnetic ink layer 48 which faces ball elements 28 and confronts transducer 52. The configuration of transducer mounting ring 72 and tone ring 74 shown in FIG. 5 provides a labyrinth sealing system. As mentioned previously, this sealing system would be used with conventional elastomeric seal 76 present within the annular cavity formed between the two rings in FIG. 5.

Figure 6:
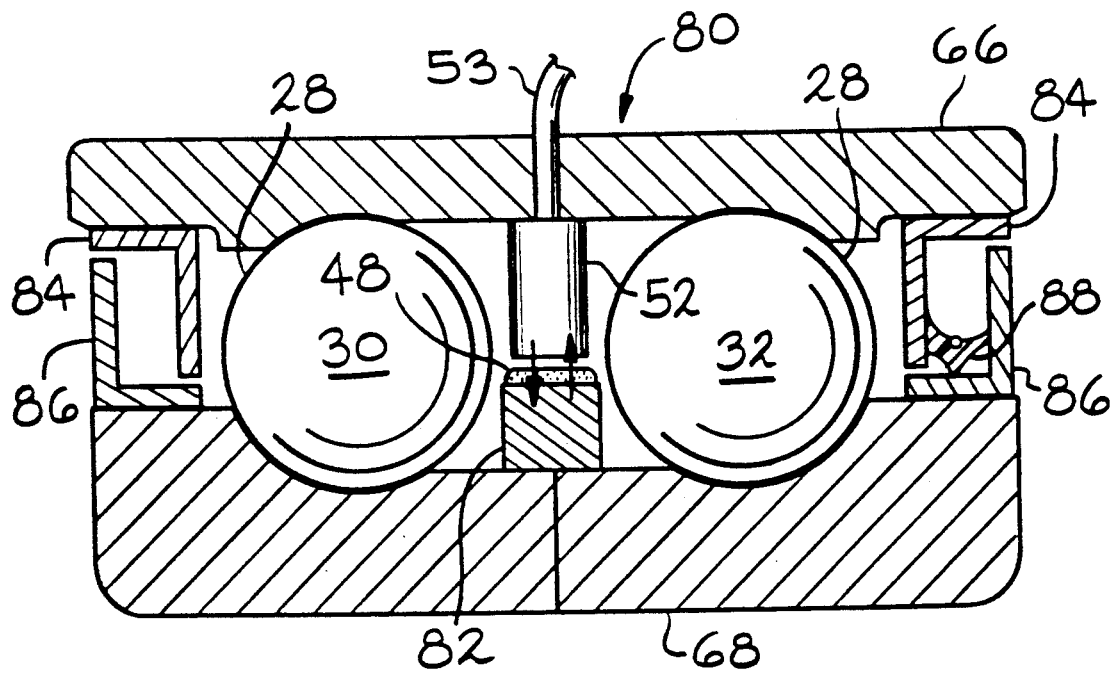
FIG. 6 is a cross-sectional view through a bearing assembly in accordance with a fourth embodiment of this invention adapted for driven wheel applications with the transducer and tone ring placed between the bearing rolling elements.

In FIG. 6, still another embodiment of a bearing assembly incorporating a wheel speed sensor 80 in accordance with this invention is shown. In this case, the sensor is located between the inboard and outboard races 30 and 32, and is thus protected from the outside environment and placed in an area which is ordinarily unused. This embodiment is also adapted for driven wheel applications. In this case, transducer 52 is simply fastened to outer race 66 and confronts the tone ring 82 which is press-fit or trapped on inner race 68 and defines a magnetic ink layer 48 as is the case in the prior embodiments. This embodiment could incorporate the tone ring mounting approaches described and claimed in U.S. Pat. Nos. 4,969,753 and 4,938,612, both assigned to the assignee of this application. Rings 84 and 86 define surfaces for mounting and contacting seal 88. The embodiment of FIG. 6 could easily be reversed (i.e. tone ring mounted to the outer race 66) for non-driven wheel applications.

Figure 7:
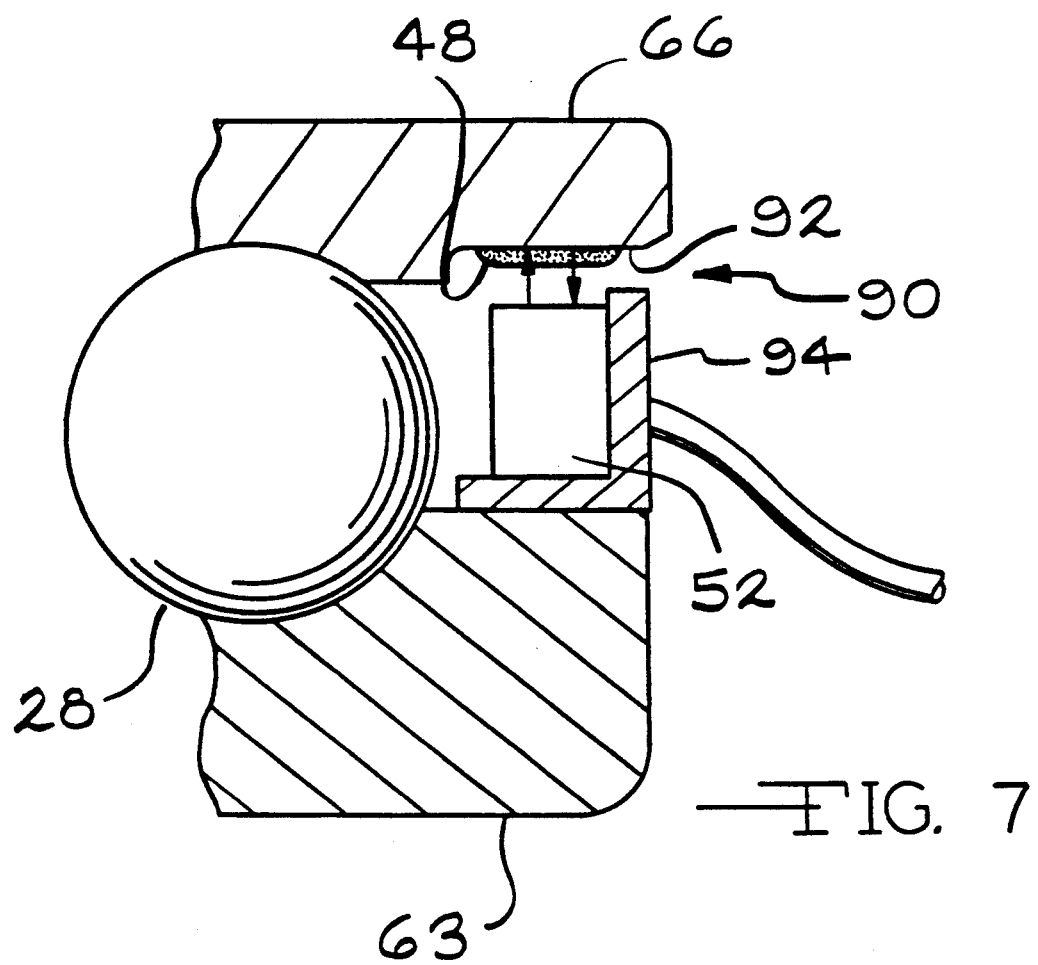
FIG. 7 is a partial cross-sectional view of a bearing assembly in accordance with a fifth embodiment of this invention in which an existing surface of the bearing defines a magnetized surface through the application of magnetic ink.

FIG. 7 illustrates another embodiment of a bearing assembly incorporating a wheel speed sensor 90 in accordance with this invention. This embodiment differs from the prior configurations in that magnetic ink layer 48 is coated directly onto an inside cylindrical surface 92 of outer race 66. For this embodiment, transducer 52 is mounted to bracket 94 confronting magnetic ink layer 48.

The various embodiments of this invention illustrate the flexibility which the use of magnetic ink layer 48 provides. All that is necessary is the formation of an appropriately shaped tone ring substrate and then any surface desired can be conveniently coated with the magnetic ink and thereafter magnetized. Moreover, existing surfaces such as bearing races or seals could be used to define the tone ring. Therefore, this approach provides broad design flexibility and compactness.

While the above description constitutes the preferred embodiments of the present invention, it will be appreciated that the invention is susceptible of modification, variation and change without departing from the proper scope and fair meaning of the accompanying claims.

We claim:

1. A rotation sensor for detecting relative rotation between two components which are coupled by an anti-friction bearing, comprising:
   a tone ring defined by a layer of magnetic ink, said layer defining multiple magnetic poles, said tone ring fixed relative to one of said components, and
   a transducer fixed relative to the other of said components positioned relative to said tone ring such that relative rotation between said components causes a varying magnetic field to interact with said transducer.

2. A rotation sensor for detecting relative rotation according to claim 1 wherein said components are inner and outer bearing races separated by rolling bearing elements.

3. A rotation sensor for detecting relative rotation according to claim 2 wherein said tone ring further comprises a substrate for supporting said layer in the form of a metal ring mounted to one of said races.

4. A rotation sensor for detecting relative rotation according to claim 3 wherein said ring substrate defines a radial surface having said layer of magnetic ink coated thereon.

5. A rotation sensor for detecting relative rotation according to claim 3 wherein said ring substrate defines a cylindrical surface having said layer of magnetic ink coated thereon.

6. A rotation sensor for detecting relative rotation according to claim 2 further comprising a transducer mounting ring mounted to one of said inner or outer bearing races.

7. A rotation sensor for detecting relative rotation according to claim 2 wherein said tone ring is integral with a bearing seal element.

8. A rotation sensor for detecting relative rotation according to claim 2 wherein said tone ring is integral with one of said races.

9. A rotation sensor for detecting rotation of a motor vehicle wheel mounted to the vehicle through a wheel bearing having inner and outer bearing races with rolling elements therebetween, comprising:
   a tone ring coupled to either said inner or outer bearing race defined by a layer of magnetic ink, said layer defining multiple magnetic poles, and
   a transducer mounted to the other of said bearing races and positioned relative to said tone ring such that relative rotation between said races causes a varying magnetic field to interact with said transducer.

10. A rotation sensor for detecting rotation according to claim 9 wherein said tone ring further comprises a substrate defining a radial surface having said layer of magnetic ink coated thereon.

11. A rotation sensor for detecting rotation according to claim 9 wherein said tone ring further comprises a substrate defining a cylindrical surface having said layer of magnetic ink coated thereon.

12. A rotation sensor for detecting rotation according to claim 9 further comprising a transducer mounting ring mounted to one of said inner or outer bearing races.

13. A rotation sensor for detecting rotation according to claim 9 wherein said tone ring is integral with a bearing seal element.

14. A rotation sensor for detecting rotation according to claim 9 wherein said tone ring is integral with one of said races.

* * * * *